March 9, 1971   J. ROSÁN, SR   3,568,230
METHOD OF MAKING AN INSERT WITH EXPANDABLE HEAD FOR
LOCKING IN NONCOUNTERBORED BORES
Original Filed March 15, 1966   2 Sheets-Sheet 2

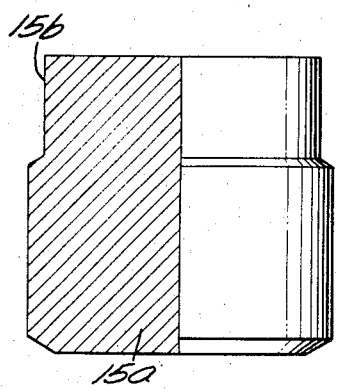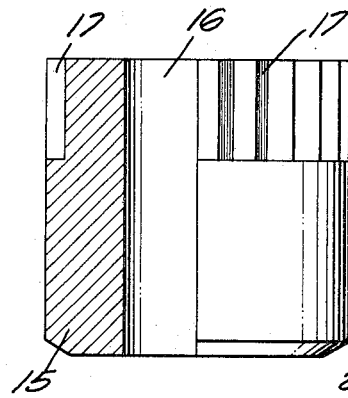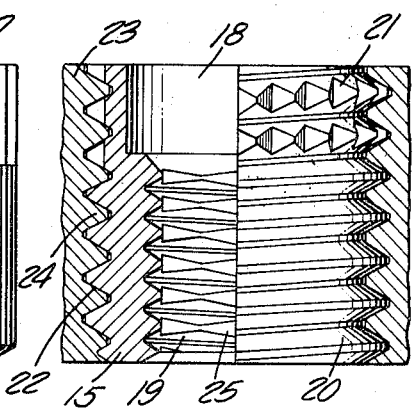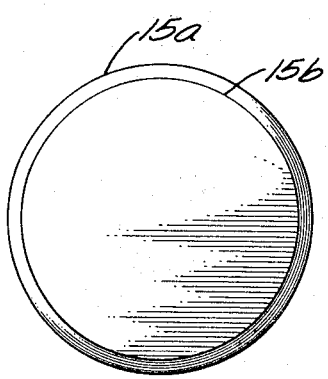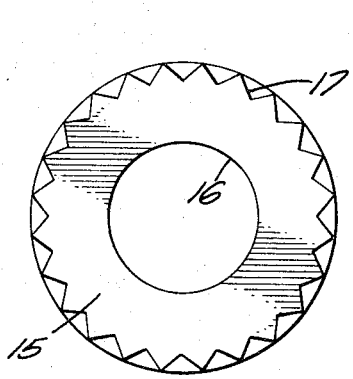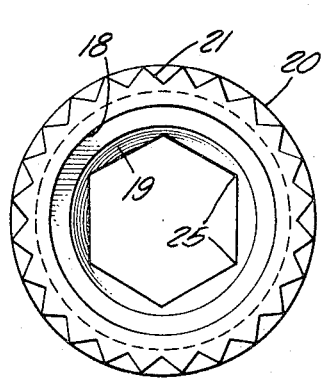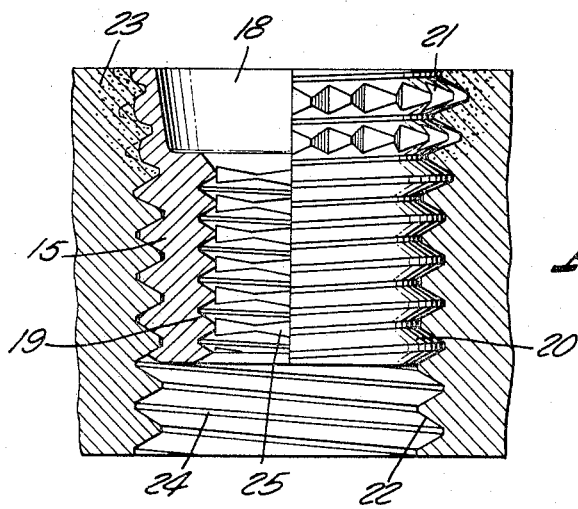

JOSÉ ROSÁN
INVENTOR

BY
ATTORNEY

United States Patent Office 3,568,230
Patented Mar. 9, 1971

3,568,230
METHOD OF MAKING AN INSERT WITH EXPANDABLE HEAD FOR LOCKING IN NON-COUNTERBORED BORES
José Rosán, Sr., San Juan Capistrano, Calif., assignor to Rosan Engineering Corp., Newport Beach, Calif.
Application Dec. 11, 1967, Ser. No. 691,115, which is a continuation of application Ser. No. 534,360, Mar. 15, 1966. Divided and this application June 20, 1969, Ser. No. 847,773
Int. Cl. B21d 53/20; F16b 25/00, 39/28
U.S. Cl. 10—86
8 Claims

ABSTRACT OF THE DISCLOSURE

The method for making an insert capable of being locked into a threaded workpiece bore without the use of a counterbore by providing the insert with a serrated expandable head, but wherein the external threads thereof have a uniform height and profile throughout the length of the insert.

---

This application is a division of my copending application Ser. No. 691,115 filed on Dec. 11, 1967, which in turn was a continuation of my application Ser. No. 534,360, filed on Mar. 15, 1966.

Heretofore, knurling of inserts to provide antirotational locking means was accomplished by first threading the outer periphery of an insert blank and then knurling the outer periphery at one end thereof. By this method, the threads at the knurled end became distorted and the material in the knurled area tended to laterally bulge outwardly so as to slightly increase the over-all diameter of the insert in this area. In addition, the cross-sectional configuration of the thread convolutions would also be longitudinally distorted and expanded. Because of this distortion and expansion, the installation of the insert in a workpiece required a counterbored bore since the knurled insert threads cannot travel along the bore thread root convolutions. That is, because of the expansion and distortion of the cross-sectional configuration of the thread convolutions in both a lateral and longitudinal direction, this portion of the external insert thread cannot be accommodated in cooperating threads of the workpiece bore.

The requirement of a counterbore necessitates the use of a special workpiece bore prepared by special tools. In addition, the workpiece bore cannot always be placed where desired since it is necessary to allow sufficient clearance for the counterbore when placed near an edge or end of a workpiece (commonly referred to as "edge distance"). The use of a counterbore further requires that the insert be utilized at the workpiece surface. Also, by the use of a counterbore, less bore threads are available to engage the insert's external threads, thus reducing the effective tensile or "pull-out" strength of the insert.

The present invention eliminates the need for a counterbore in the workpiece, thereby permitting closer "edge distance" and the installation of the insert to any depth in the bore. Furthermore, the elimination of a counterbore allows preparation of the workpiece bore with simple tools (i.e., common drill and tap) and provides additional "pull-out" strength since more workpiece bore threads are engaged by external insert threads, as aforesaid. In addition, since the insert of the present invention can be utilized without a counterbore, a plurality of inserts can be mounted in tandem in the same workpiece bore.

Accordingly, it is an object of this invention to provide a method for making an insert capable of being locked into a threaded workpiece bore without the use of a counterbore in said bore.

Another object is to provide a method for making an insert capable of being locked into a workpiece bore which requires no special hole preparation or special tools to prepare the bore.

Another object is to provide a method for making an insert which can be locked in a workpiece bore at any depth therein.

Another object is to provide a method for making an insert capable of being locked in a workpiece bore in tandem with other inserts in the same workpiece bore.

Another object is to provide a method for making an insert capable of being locked in a workpiece bore which requires a minimum amount of "edge distance" from the edge or end of the workpiece.

Other objects and advantages of the invention will become apparent from the description taken in conjunction with the accompanying drawings, in which:

FIG. 1 is an elevational, partly sectioned view of a solid blank provided with a reduced external diameter at one end thereof.

FIG. 2 is a top plan view of the blank shown in FIG. 1.

FIG. 3 is an elevational view, partly sectioned, of the blank of FIG. 1 wherein the external portion of the blank having the reduced diameter is externally knurled and the center thereof is bored throughout its length.

FIG. 4 is a top plan view of the semifinished insert of FIG. 3.

FIG. 5 is an elevational view, partly sectioned, of the finished insert screwed into a workpiece which is provided with cooperating threads. The completed insert as shown in FIG. 5 has been internally tapped and counterbored and provided with external threads. In addition, the internally tapped bore of the insert is provided with longitudinally extending drive grooves.

FIG. 6 is a top plan view of the insert illustrated in FIG. 5.

FIG. 7 is an elevational view, partly sectioned, of the insert of FIGS. 5 and 6 after the head portion thereof is outwardly expanded so that the external antirotational locking teeth opposite the counterbored area are embedded into the thread root convolutions of the workpiece bore.

Figure 8:
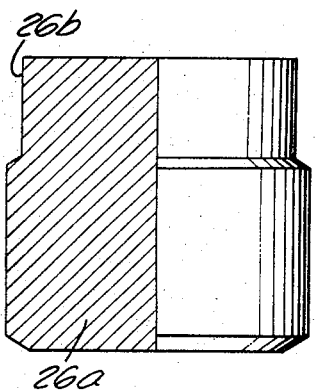

FIG. 8 is an elevational view, partly in section, of a solid blank having a reduced diameter at one end thereof similar to that illustrated in FIG. 1.

Figure 9:
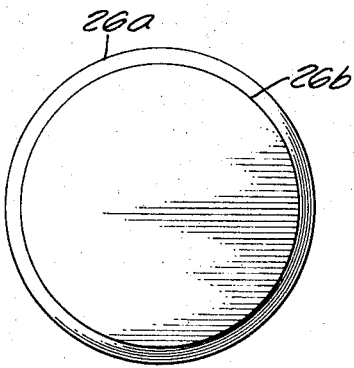

FIG. 9 is a top plan view of the blank shown in FIG. 8.

Figure 10:
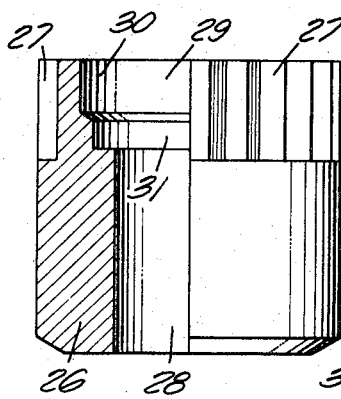

FIG. 10 is an elevational view, partly in section, of the blank of FIG. 8 wherein the external portion of the blank having the reduced diameter is externally knurled. The insert is internally bored and counterbored with a two-step counterboring tool.

Figure 11:
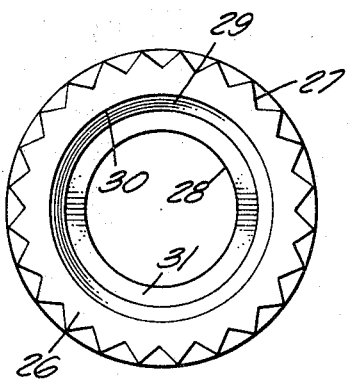

FIG. 11 is a top plan view of the semifinished insert of FIG. 10.

Figure 12:
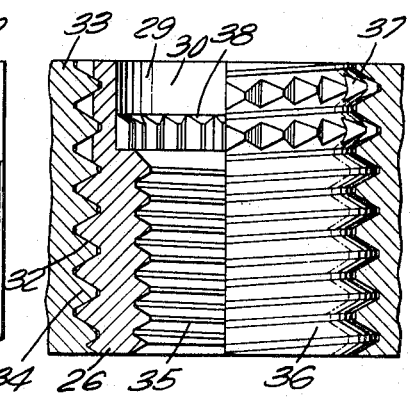

FIG. 12 is an elevational view, partly in section, of the completed insert screwed into a workpiece which is provided with cooperating threads, prior to the outward expansion of the head thereof. As shown, the insert has been internally tapped and provided with external threads. In addition, internal driving serrations are provided at the base of the upper portion of the two-step counterbore.

Figure 13:
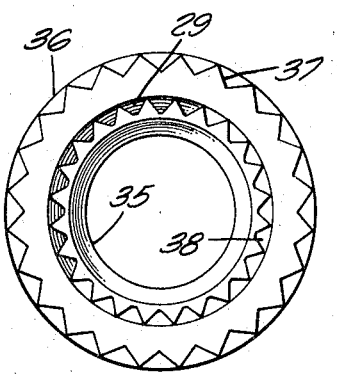

FIG. 13 is a top plan view of the insert of FIG. 12.

Figure 14:
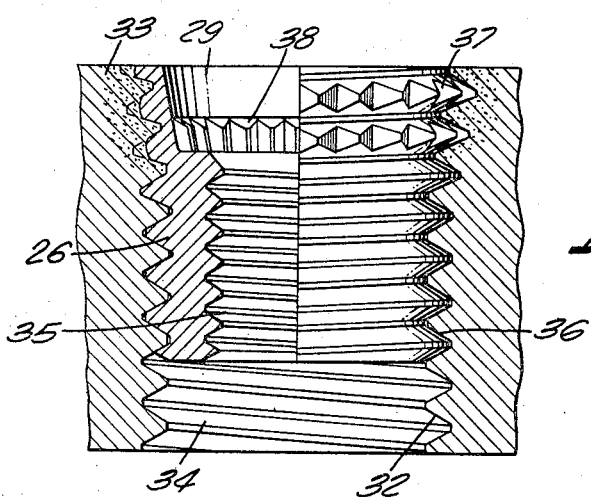

FIG. 14 is an elevational, partly sectioned view, illustrating the insert of FIG. 12 with the head portion thereof outwardly expanded into the thread convolutions of the workpiece bore.

Referring more particularly to FIGS. 1 and 2, reference numeral 15a generally designates the body of a solid blank which is provided with a body portion 15b having an external diameter less than the external diameter of the remaining portion of body 15a. The reduced diameter of body portion 15b is predetermined to obtain a specific difference between the diameter of the reduced portion 15b and the diameter of the remaining portion of the body 15a, for reasons which will hereafter be more fully described, and may be obtained by forming, cutting, grinding or any other suitable means.

FIGS. 3 and 4 show the blank of FIGS. 1 and 2 provided with an internal bore 16 so as to form an insert body 15. Insert body 15 has been knurled in the portion of the body having the reduced diameter so that longitudinal external serrations 17 are produced thereby. It should be noted that after the external longitudinal serrations 17 have been provided to the reduced diameter portion of body 15, the over-all diameter of the insert body 15, including the area provided with serrations 17, is constant. That is, after the knurling operation, the diameter of the knurled area is the same as the diameter of the remainder of the insert body 15. This feature is important, as will hereafter be more fully described, so that the completed insert may be threaded into a threaded workpiece bore without obstruction or interference with the workpiece bore threads.

In FIGS. 5 and 6, internal bore 16 of insert body 15 has been provided with an internal counterbore 18 and internal threads 19. Insert body 15 is also provided with external threads 20 which have been formed by a grinding operation. It should be noted that by forming the threads 20 over the external serrations 17 of the body 15, outwardly extending teeth 21 are formed along the thread convolutions in the serrated area. An important result is obtained in that the cross sectional configuration of the thread convolutions (and concomitantly the outwardly extending teeth) in the serrated area, are substantially the same as the cross sectional configuration of the thread convolutions of the insert body. That is, the thread form and pitch of the external threads 20 of the insert are uniform regardless of whether said threads are formed over the knurled or smooth portion of the body.

It is also important that the external threads 20 be provided by a grinding operation rather than "roll threading" since "roll threading" will distort the serrations 17, thereby prohibiting the threading of the insert into the threaded bore 22 in workpiece 23, since any distortion to the configuration of the external threads 20 would preclude the accommodation thereof in the corresponding threads 24 of the workpiece bore. Even if threads 20 were rolled prior to the knurling operation, the knurling operation would also distort the threads in the area of the external serrations 17 thereby prohibiting satisfactory screwing of the insert into the workpiece bore.

The insert in FIG. 5 is shown fully threaded into threaded bore 22 in workpiece 23 having threads 24 which are adapted to receive external threads 20, and is shown prior to the outward expansion of the tooth head portion into the thread root convolutions of threads 24 of workpiece bore 22. It is important to note that the diameters of the crests and roots of the external threads 20 in the area of the serrated (now toothed) portion of the insert are the same as the diameters of the crests and roots of the external thread convolutions on the insert body 15. As hereinabove mentioned, since the convolutional configuration of external threads 20 is similar to the convolutional configuration of the remaining portion of the external threads 20, the insert is easily threaded into bore 22 of workpiece 23. Thus, the teeth 21 in the head portion of the insert body 15 do not bind in the root convolutions of threads 24 of workpiece bore 22.

Bore 22 in workpiece 23 in FIG. 5 is not provided with a counterbore. By elimination of a counterbore in conjunction with workpiece bore 22, said bore, and concomitantly the insert, may be utilized closer to the edge or end of the workpiece, thereby reducing the "edge distance" required for the installation thereof. In many instances this is of extreme importance.

Heretofore, as hereinabove indicated, "roll forming" threads after the knurling operation or knurling the threads after the threading operation would cause the threads to be distorted and expanded in this region, thereby requiring the use of a counterbore having a diameter greater than the maximum workpiece bore diameter so that the distorted and expanded portion of the insert head could be accommodated therein. In addition, such a counterbore would have a smooth wall rather than a threaded wall, thereby permitting threaded engagement of only a portion of the external insert threads with the workpiece bore threads.

In FIGS. 5 and 6, after internal bore 16 of the insert body 15 is tapped, drive grooves 25 are longitudinally broached across consecutive convolutions of threads 19. Drive grooves 25 are adapted to receive a corresponding tool (not shown) which, when rotated, will thread the insert body 15 into the threaded bore 22. Of course, after the drive grooves are broached through the internal threads 19 of insert body 15, the threaded bore may then be retapped to re-form the internal threads which have been distorted by the broaching operation.

FIG. 7 shows the insert body 15, which has been threaded into bore 22 of workpiece 23, after the toothed collar portion thereof has been outwardly expanded into the threads 24 of workpiece bore 22. By outwardly expanding the toothed portion of the insert body 15, teeth 21 are embedded into the root convolutions of threads 24 thereby resisting further rotational movement of the insert, thus creating a permanent antirotational locking of insert body 15 into the workpiece 23. The material of the workpiece immediately adjacent the expanded teeth 21 (shown by stippling) is compacted and work hardened, thereby further increasing the resistance of the insert against rotational forces.

In brief summation, the insert of the instant invention hereinabove described is made in the following manner. A solid blank is formed so as to have the diameter of one end thereof less than the diameter of the blank body. The body portion having the reduced diameter is then knurled by rolling Thereafter, the solid blank is bored, counterbored and tapped, respectively, in successive steps.

After the internal bore is tapped, drive groove means are longitudinally broached through the internal threads. The internal threads may or may not then be retapped, depending upon the amount of distortion occurring to the internal threads after the broaching of the drive grooves thereon. Finally, external threads are ground on the insert body including the knurled collar, thereby providing at least the uppermost two thread convolutions with outwardly extending locking teeth.

The workpiece into which the above described insert is to be installed is simply bored and tapped and the insert screwed therein by an appropriate driving tool. After the insert is installed at the desired depth in the workpiece bore, the toothed portion of the insert is outwardly expanded into the root convolutions of the workpiece bore.

FIGS. 8–14 illustrate another embodiment of the insert shown in FIGS. 1–7.

In FIGS. 8 and 9, a body blank 26a is illustrated, similar to that shown in FIGS. 1 and 2, having a portion 26b at one end thereof with a reduced diameter relative to the diameter of body 26a. Reduced diameter portion 26b may be obtained by any of the means described relative to the device in FIGS. 1 and 2.

In FIGS. 10 and 11, body blank 26a is prepared in the same manner as the blank of FIGS. 3 and 4, with serrations 27 superimposed in the area of the reduced portion 26b of body blank 26a. Body blank 26a is further provided with an internal bore 28, thereby producing insert body 26. Internal bore 28 has a double (two-step) counterbore 29, wherein the outermost portion 30 of the counterbore 29 is larger in diameter than the innermost portion 31 thereof and said portions are in longitudinal spatial alignment with each other. Again, as was the case in the insert of FIGS. 3 and 4, after the formation of the external head serrations 27, the external diameter of the insert is uniform throughout.

FIGS. 12 and 13 illustrate the completed insert. In FIG. 12 the insert is shown threaded into bore 32 in workpiece 33 in threaded engagement with the bore threads 34 of said workpiece bore 32. The insert has been internally tapped to provide internal threads 35, and has been ground on the external surface thereof to provide external threads 36. It will be noted that, as was the case of the insert of FIGS. 5 and 6, the thread convolutions are superimposed over the serrations 27 on body 26, thereby producing a plurality of outwardly projecting teeth 37 positioned along the uppermost thread convolutions of threads 36. Also, as was the case in the insert of FIGS. 5 and 6, the diameter across the crests and roots of the outwardly projecting teeth 37 as well as the thread form and pitch of the thread convolutions of threads 36 in the serrated portion of the insert, are uniform with the balance of threads 36 formed on the insert body.

The innermost portion 31 of counterbore 29 is broached by an appropriate tool (not shown) to produce internal serrations 38 extending from the base of the innermost portion 31 to the base of the outermost portion 30 of the counterbore. The effect of broaching the wall of the innermost portion 31 of counterbore 29 to produce internal serrations 38, is to provide a uniform and continuous counterbore having internal driving serrations at the base thereof. Serrations 38 may be engaged by a suitable driving tool (not shown) for threading the insert into workpiece bore 32.

In FIG. 14 the insert is illustrated threaded into threaded workpiece bore 32 and has the toothed collar portion of the insert body 26 (and concomitantly teeth 37) outwardly expanded into the root convolutions of threads 34 of workpiece bore 32 thereby providing an antirotational lock, as was the case with the insert shown in FIG. 7. It will be noted that an outward expansion of the toothed collar portion is not detrimentally affected by the location of internal serrations 38 at the base of counterbore 29.

Briefly summarizing, the alternate embodiment of the insert of the invention is made as follows. A solid blank is formed so as to have the diameter of one end thereof less than the diameter of the blank body. The body portion having the reduced diameter is then knurled by rolling. Thereafter, the solid blank is bored and counterbored with a two-step counterboring tool so as to provide a two-part counterbore having the outermost portion thereof larger in diameter than the innermost portion of the counterbore. The wall of the innermost portion of the counterbore is then punched or broached so as to produce inwardly projecting serrations extending from the base of the innermost portion of the counterbore to the base of the outermost portion of said counterbore. That is, internal driving serrations are thus formed situated at the base of the counterbore and extending longitudinally for only a portion thereof.

After the punching or broaching operation, the internal insert bore is tapped to provide internal threads therein. External threads are then ground throughout the length of the insert body including the knurled collar thereof. By grinding threads over the knurled portion of the insert body, outwardly extending locking teeth are formed on the thread convolutions which are superimposed over the knurled area.

The workpiece into which the above described insert is to be installed is simply bored and tapped by ordinary tools and the insert screwed therein by an appropriate driving tool which is adapted to engage the internal counterbore serrations of the insert. After the insert is installed at the desired depth in the workpiece bore, the tooth portion of the insert is outwardly expanded into the root convolutions of the workpiece bore so as to provide a positive antirotational locking of the insert in the workpiece bore.

Although the insert of the present invention is shown with a toothed, outwardly expandable locking means at one end of the insert, it should be noted that the insert may have a reduced diameter portion at both ends thereof and may be subsequently knurled at both of said ends. Thus, when the insert body is externally threaded, outwardly extending teeth are formed at both ends of the insert which have the same dimension and characteristics as do those of the above described insert of the present invention. The insert could also be utilized with a workpiece bore without a counterbore in the same manner as the insert hereinbefore described.

While several embodiments of the invention have been described, it is, of course, understood that the particular embodiments of the invention herein disclosed are for illustrative purposes only.

I claim:
1. The method of making an insert having an integral expandable head for locking the same into a bore in a workpiece, comprising the steps of:
   forming a reduced diameter portion on at least one end of a solid cylindrical body blank;
   forming external serrations on said reduced body portions;
   providing an axial bore in said body;
   providing a counterbore in said body contiguous to said axial bore in said body blank;
   forming threads in said axial bore;
   forming internal driving means in said axial bore; and
   externally threading the serrated area and at least a portion of the remaining external surface of said body.

2. The method of making an insert as described in claim 1, wherein the serrations are formed so that the maximum diameter across said serrations does not exceed the diameter of the body blank, and wherein the external threads are formed so that the diameter of the crests, the diameter of the roots, the thread form and pitch, respectively, are uniform throughout the externally threaded portion of the insert body.

3. The method of making an insert as described in claim 1, wherein the serrations are formed by knurl rolling, and the external threads are formed by thread grinding means.

4. The method of making an insert as described in claim 1, wherein the counterbore is formed with an outermost part and an innermost part having a lesser diameter than the diameter of said outermost part, and the internal driving means are grooves formed longitudinally through the innermost portion of said counterbore and wherein the threads are formed in the axial bore after forming the grooves longitudinally through the innermost portion of the counterbore.

5. The method of making an insert as described in claim 4, wherein the external serrations are formed so that the maximum diameter across said serrations does not exceed the diameter of the body blank, and wherein the external threads are formed so that the diameter of the crests, the diameter of the roots, the thread form and pitch, respectively, are uniform throughout the externally threaded portion of the insert body.

6. The method of making an insert as described in claim 4, wherein the external serrations are formed by knurl rolling, and the external threads are formed by thread grinding means.

7. The method of making an insert as described in claim 4, wherein the longitudinal internal serrations are formed by broaching the wall of the innermost portion of said counterbore.

8. The method of making an insert as described in claim 1, wherein the internal driving means are grooves formed longitudinally through a substantial number of the internal thread convolutions formed in the axial bore.

References Cited
UNITED STATES PATENTS

| | | | |
|---|---|---|---|
| 166,113 | 7/1875 | Kent | 151—16 |
| 3,018,808 | 3/1963 | Rosan et al. | 151—41.73 |
| 3,127,625 | 4/1964 | Ruminsky | 10—10 |
| 3,233,258 | 2/1966 | Neuschotz | 10—86 |
| 3,280,872 | 10/1966 | Neuschotz | 151—41.73 |

FOREIGN PATENTS

| | | | |
|---|---|---|---|
| 897,908 | 6/1944 | France | 85—46 |

CHARLES W. LANHAM, Primary Examiner

R. M. ROGERS, Assistant Examiner

U.S. Cl. X.R.

10—1; 151—41.72; 85—46